United States Patent [19]

Nakamae et al.

[11] Patent Number: 5,387,638

[45] Date of Patent: Feb. 7, 1995

[54] EMULSION COMPOSITION

[75] Inventors: Masato Nakamae, Kurashiki; Ken Yuki, Osaka; Hirotoshi Miyazaki, Kurashiki; Hitoshi Maruyama, Osaka, all of Japan

[73] Assignee: Kuraray Co., Ltd., Kurashiki, Japan

[21] Appl. No.: 111,536

[22] Filed: Aug. 25, 1993

[30] Foreign Application Priority Data

Sep. 7, 1992 [JP] Japan ................. 4-237853

[51] Int. Cl.⁶ ............................................. C08L 29/00
[52] U.S. Cl. ................................... 524/503; 524/459; 524/514
[58] Field of Search ................. 524/514, 503, 459

[56] References Cited

U.S. PATENT DOCUMENTS

| | | | |
|---|---|---|---|
| 4,098,746 | 7/1978 | Becker et al. | 524/459 X |
| 4,189,415 | 2/1980 | Eck et al. | 524/503 X |
| 4,235,764 | 11/1980 | Dereser et al. | 524/503 |
| 4,458,050 | 7/1984 | Heyman . | |
| 4,571,412 | 2/1986 | Minamida et al. | 524/64 |
| 4,788,243 | 11/1988 | Soerens | 524/503 |
| 4,818,783 | 4/1989 | Shioji et al. | 524/503 X |
| 4,963,611 | 10/1990 | Nagasawa et al. | 524/459 |
| 4,985,486 | 1/1991 | Westeppe et al. | 524/514 |
| 5,092,953 | 3/1992 | Derby et al. | 524/503 X |
| 5,109,053 | 4/1992 | Smith et al. | 524/514 |
| 5,200,458 | 4/1993 | Iwasaki et al. | 524/503 X |
| 5,219,914 | 6/1993 | Warburton, Jr. | 524/514 X |

FOREIGN PATENT DOCUMENTS

| | | | |
|---|---|---|---|
| 0389268 | 9/1990 | European Pat. Off. . | |
| 0202364 | 12/1982 | Japan | 524/459 |
| 0205460 | 12/1982 | Japan | 524/459 |
| 0013602 | 1/1983 | Japan | 524/459 |
| 3536264 | 4/1987 | Netherlands | 524/459 |

*Primary Examiner*—Judy M. Reddick
*Attorney, Agent, or Firm*—Oblon, Spivak, McClelland, Maier & Neustadt

[57] ABSTRACT

There is disclosed an emulsion composition which comprises an aqueous emulsion (A) obtained by emulsion polymerization of 100 parts by weight of an ethylenically unsaturated monomer in the presence of 1 to 15 parts by weight of a carboxyl group-modified polyvinyl alcohol such as itaconic acid-modified polyvinyl alcohol as the dispersant and a polyamide resin (B) such as polyamide epichlorohydrin. The above emulsion composition has a long pot-life and can easily be made into a film having a high wet strength and being excellent in water resistance, hot water resistance and heat resistance. Accordingly, it can effectively be utilized in a variety of applications including paint coating, adhesive, fiber sizing agent and paper coating.

5 Claims, No Drawings

EMULSION COMPOSITION

BACKGROUND OF THE INVENTION

1. Field of the Invention

The present invention relates to an emulsion composition. More particularly, it relates to an emulsion composition which has a long pot-life and can be made into a film having a high wet strength and being excellent in water resistance, hot water resistance and heat resistance, said film being obtained by coating said emulsion composition and thereafter evaporating the water contained therein.

2. Description of Related Arts

The emulsion produced by the use of polyvinyl alcohol as the protective colloid (dispersant) has admirably been used in a variety of applications such as paint coating, adhesive, fiber sizing agent and paper coating since long years before.

However, since polyvinyl alcohol is water-soluble, the film obtained by evaporating the water contained in the above-mentioned emulsion involves the problems as described hereunder.

The film is so insufficient in water resistance that it is liable to swell in water and that it is liable to be eluted when the film is immersed in water. In addition, when the film is immersed in water and the water is boiled, the swelling and elution as mentioned above are accelerated, resulting in failure to maintain the original form of the film.

In many cases, the emulsion shows its performance when it is made into a film. Accordingly, the glass transition temperature of a resin as the dispersoid is adjusted to room temperature or to the extent that film formation is possible by heat treatment in a short time. Thus, the working temperature exceeding the glass transition temperature softens the film and deteriorates its heat resistance.

A variety of attempts have heretofore been made to improve the water resistance, hot water resistance and heat resistance of the film obtained from the emulsion in which polyvinyl alcohol is used as the dispersant.

As an typical example thereof, there is known a method in which an emulsion containing polyvinyl alcohol as the dispersant is blended with a polyvalent isocyanate compound. The method, however, involves the problem of the workability due to the short pot-life of the composition thus obtained.

There are also proposed various adhesives comprising an aqueous emulsion containing polyvinyl alcohol as the dispersant. For example, there are disclosed (1) an adhesive which comprises an aqueous emulsion containing as the dispersant polyvinyl alcohol having a ratio (Mw/Mn) of weight-average molecular weight (Mw) to number-average molecular weight (Mn) of 2.4 or less and a crosslinking agent (Japanese Patent Application Laid-Open No. 108603/1986); (2) an adhesive which comprises an aqueous emulsion containing polyvinyl alcohol as the dispersant and an aliphatic aldehyde such as glyoxal (Japanese Patent Application Laid-Open No. 94937/1980; (3) an adhesive which comprises polyvinyl alcohol, an aqueous emulsion, a crosslinking agent and an amino compound such as chitosan (Japanese Patent Application Laid-Open No. 45678/1991); (4) an adhesive which comprises polyvinyl alcohol, an aqueous emulsion, a crosslinking agent such as aluminum chloride and a polyvalent isocyanate compound (Japanese Patent Publication No. 16150/1982); and the like.

Nevertheless, in the above-mentioned adhesive (1), the crosslinking agent is not specifically exemplified and there exists the problem of the workability due to the short pot-life of the composition. The adhesives (2) and (3) have the disadvantage that the films obtained therefrom is low in wet strength. The adhesive (4) has the problem of the workability due to the short pot-life thereof.

Under such circumstances, the present invention has been contrived for the purpose of providing an emulsion composition which is favorable in workability due to a long pot-life and can be made into a film having a high wet strength and being excellent in water resistance, hot water resistance and heat resistance, said film being obtained by coating said emulsion composition and thereafter evaporating the water contained therein.

SUMMARY OF THE INVENTION

As a result of intensive research and investigation made by the present inventors in order to develop an emulsion composition having the favorable properties as mentioned above, it has been found that the objective properties are achieved by an emulsion composition which comprises an aqueous emulsion obtained by emulsion polymerization of an ethylenically unsaturated monomer in the presence of a prescribed proportion of a carboxyl group-modified polyvinyl alcohol as the dispersant; and a polyamide resin. The present invention has been accomplished on the basis of the above-mentioned finding and information.

Specifically, the present invention provides an emulsion composition which comprises an aqueous emulsion (A) obtained by emulsion polymerization of 100 parts by weight of an ethylenically unsaturated monomer in the presence of 1 to 15 parts by weight of a carboxyl group-modified polyvinyl alcohol as the dispersant and a polyamide resin (B).

DESCRIPTION OF PREFERRED EMBODIMENT

The emulsion composition according to the present invention comprises a specific aqueous emulsion (A) and a polyamide resin (B). As mentioned above, the aqueous emulsion (A) comprises a polymer from an ethylenically unsaturated monomer as the dispersoid and a carboxyl group-modified polyvinyl alcohol as the dispersant.

The carboxyl group-modified polyvinyl alcohol as the dispersant is not specifically limited insofar as it is a modified polyvinyl alcohol having a carboxyl group in the molecule. In general, preferably usable ones include a random copolymer obtained by a method in which a vinyl ester monomer typified by vinyl acetate is copolymerized with an ethylenically unsaturated carboxylic acid such as acrylic acid, methacrylic acid, phthalic acid, phthalic anhydride, maleic acid, maleic anhydride, itaconic acid and itaconic anhydride, followed by hydrolyzing the resultant copolymer, and a block copolymer obtained by radical polymerization of the above-exemplified ethylenically unsaturated carboxylic acid in the presence of polyvinyl alcohol having a thiol group at an end thereof.

As the above vinyl ester monomers other than vinyl acetate, there are exemplified vinyl formate, vinyl propionate, vinyl versatate, vinyl pivalate, etc.

The degree of polymerization of the carboxyl group-modified polyvinyl alcohol in the present invention is not specifically limited, but is preferably in the range of 50 to 3000, more preferably 100 to 2000. Likewise, the degree of hydrolysis thereof is not specifically limited, but is preferably in the range of 70 to 100 mol %, more preferably 80 to 98 mol %. Similarly, the content of a carboxylic group in the carboxyl group-modified polyvinyl alcohol is not specifically limited, but is preferably in the range of 0.1 to 50 mol %, more preferably 0.5 to 10 mol %, particularly preferably 0.5 to 5 mol %. The content of a carboxyl group of less than 0.1 mol % results in failure to assure sufficient crosslinking efficiency and to enhance water resistance, whereas that of more than 50 mol % leads to difficulty in assuring a stable emulsion, or to a short pot-life and difficulty in developing adhesivity and flow properties thereof after the addition of the polyamide (B) even if a stable aqueous emulsion is obtained.

In addition, the carboxyl group-modified polyvinyl alcohol can be copolymerized with a copolymerizable ethylenically unsaturated comonomer to the extent that the copolymerization does not impair the effect of the present invention. Examples of such copolymerizable ethylenically unsaturated comonomer include ethylene, isobutylene, acrylonitrile, methacrylonitrile, acrylamide, methacrylamide, trimethyl-(3-acrylamide-3-dimethylpropyl)ammonium chloride, ethylvinyl ether, butylvinyl ether, N-vinylpyrrolidone, vinyl chloride, vinyl bromide, vinyl fluoride, vinylidene chloride, vinylidene fluoride, tetrafluoroethylene, sodium vinylsulfonate, sodium allylsulfonate, etc. There is also usable an end-modified product obtained by a method in which a vinyl ester monomer such as vinyl acetate is copolymerized with an ethylenically unsaturated carboxylic acid in the presence of a thiol compound such as thiolacetic acid and mercaptopropionic acid, followed by hydrolysis of the resultant copolymer.

A variety of polymers are available as the polymer from an ethylenically unsaturated monomer which constitute the dispersoid in the aqueous emulsion (A). Examples of the preferable ethylenically unsaturated monomer as the starting material for the above-mentioned polymer include olefins such as ethylene, propylene and isobutylene; halogenated olefins such as vinyl chloride, vinyl fluoride, vinylidene chloride and vinylidene fluoride; vinyl esters such as vinyl formate, vinyl acetate, vinyl propionate and vinyl versatate; acrylic acid; methacrylic acid; acrylic esters such as methyl acrylate, ethyl acrylate, butyl acrylate, 2-ethylhexyl acrylate, dodecyl acrylate and 2-hydroxyethyl acrylate; methacrylic ester such as methyl methacrylate, ethyl methacrylate, butyl methacrylate, 2-ethylhexyl methacrylate, dodecyl methacrylate and 2-hydroxyethyl acrylate; dimethylaminoethyl acrylate, dimethylaminoethyl methacrylate and quaternary products thereof; acrylamide monomer such as acrylamide, methacrylamide, N-methylolacrylamide, N,N-dimethylacrylamide, acrylamide-2-methylpropanesulfonic acid and sodium salt thereof; styrenic monomer such as styrene, α-methylstyrene, p-styrenesulfonic acid and sodium and potassium salt thereof; N-vinylpyrrolidone; and diene monomer such as butadiene, isoprene and chloroprene. Any of the above monomers may be used alone or in combination with at least one of them.

Among the above-exemplified ethylenically unsaturated monomers, a vinyl ester, a (meth)acrylic ester, styrene and a diene monomer are preferable. Furthermore a vinyl ester, a (meth)acrylic ester and combination of ethylene and a vinyl ester are particularly preferable.

The aqueous emulsion (A) is obtained by a method in which said ethylenically unsaturated monomer is subjected, intermittently or continuously fed, to emulsion polymerization in the presence of the aqueous solution of the above-mentioned carboxyl group-modified polyvinyl alcohol as the dispersant by the use of a polymerization initiator. There is also adoptable the emulsion polymerization method in which said ethylenically unsaturated monomer is emulsified in advance by the use of the aqueous solution of the carboxyl group-modified polyvinyl alcohol and the resultant emulsion is continuously fed to the polymerization reaction system.

The amount of the carboxyl group-modified polyvinyl alcohol to be used is 1 to 15 parts by weight, preferably 2 to 12 parts by weight per 100 parts by weight of the ethylenically unsaturated monomer. An amount of less than 1 part by weight or more than 15 parts by weight of the carboxyl group-modified polyvinyl alcohol causes deterioration of polymerization stability or decreases in wet strength and water resistance of the film obtained from the emulsion composition.

The carboxyl group-modified polyvinyl alcohol as the dispersant may be used in combination, if necessary, with a conventional known surfactant of anionic, nonionic or cationic nature, polyvinyl alcohol, hydroxyethyl cellulose or the like.

The polyamide resin (B) to be employed in the emulsion composition according to the present invention is preferably the one that causes crosslinking reaction with the aqueous emulsion (A), more preferably the one having a functional group reactive with the carboxyl group of the carboxyl group-modified polyvinyl alcohol as the dispersant of the aqueous emulsion (A). Specific examples of the polyamide resin (B) include preferably a reaction product from polyamide and an epoxy group-containing compound, more preferably a reaction product from polyamide and a glycidyl group-containing compound, particularly preferably polyamide epichlorohydrin which is the reaction product from polyamide and epichlorohydrin.

The polyamide epichlorohydrin is the water-soluble quaternary resin produced by reacting the polyamide with epichlorohydrin, said polyamide obtained by condensation reaction of an alkylpolyamine compound and an alkyldicarboxylic acid and is exemplified by the product produced by reacting the polyamide with epichlorohydrin, said polyamide obtained from adipic acid and diethylenetriamine.

The degree of polymerization of the polyamide resin (B) is not specifically limited but is preferably in the range of 5 to 10,000 mPas.s (millipascal second), more preferably 10 to 5000 mPas.s, particularly preferably 10 to 1000 mPas.s of 10% by weight aqueous solution thereof at 25° C. as measured by Brookfield type viscometer. The content of the functional group in said polyamide resin (B) is not specifically limited, but is preferably in the range of 0.01 to 1 mol/100 g, more preferably 0.03 to 0.5 mol/100 g.

The emulsion composition according to the present invention is prepared by any of various methods and is usually prepared by adding, with mixing, the polyamide resin (B) of solid powder, aqueous solution or proper water-soluble solvent solution to the aqueous emulsion (A). The amount of the polyamide resin (B) to be added is preferably in the range of 0.1 to 30 parts by weight, more preferably 0.2 to 15 parts by weight per 100 parts by weight of the solid content in said aqueous emulsion (A). An amount of component (B) of less than 0.1 part by weight is liable to unsatisfy the working effect of the present invention such as wet strength and water resistance, hot water resistance and heat resistance of the film obtained from the emulsion composition, whereas that of more than 30% by weight may unfavorably cause deterioration of stability of the emulsion composition, and short pot-life of the emulsion composition after mixture of the polyamide resin (B) with the aqueous emulsion (A), and also decreases in water resistance of the film.

The emulsion composition according to the present invention which is composed principally of the above-mentioned aqueous emulsion (A) and the polyamide resin (B) may be optionally or as required, incorporated with a water-soluble polymer such as starch, modified starch, oxidized starch, sodium alginate, carboxymethyl cellulose, methylcellulose, hydroxymethyl cellulose, maleic anhydride/isobutene copolymer, maleic anhydride/styrene copolymer and maleic anhydride/methylvinyl ether copolymer; or a thermosetting resin generally being in use as an adhesive such as urea/formalin resin, urea/melamine/formalin rein and phenol/formalin resin.

In addition, the emulsion composition according to the present invention can optionally be incorporated with a filler such as clay, kaolin, talc, calcium carbonate and wood powder, a bulk filler such as wheat powder, a reaction accelerator such as boric acid and aluminum sulfate, a pigment such as titanium dioxide, an additive such as preservative and rust preventive, or the like.

In summary, the emulsion composition according to the present invention has a very long pot-life and can be made into a film having a high wet strength and being excellent in water resistance, hot water resistance and heat resistance, said film being obtained by coating said emulsion composition and thereafter evaporating the water contained therein.

Accordingly, the emulsion composition according to the present invention can be effectively utilized in a variety of applications such as paint coating, adhesive, fiber sizing agent and paper coating.

In the following, the present invention will be described in more detail with reference to the non-limitative examples and comparative examples, in which part, parts and % are based on weight unless otherwise noted. Measurements of pot-life of the emulsion composition, and wet tensile strength and water resistance, hot water resistance and heat resistance of the film obtained from the emulsion composition were made by the following procedures.

(1) Pot-life of emulsion composition

The emulsion composition was placed in a vessel with a lid and allowed to stand at 20° C., and the gelling time (the period of time required for losing the fluidity of the composition) was measured as the pot-life.

(2) Wet tensile strength of film

The emulsion composition was flow casted on a glass plate and dried at 50° C. to form a film having 0.5 mm in thickness. Then the obtained film was immersed in water at 20° C. for 24 hours and the wet film taken out from the water, as it is without drying, was measured the maximum wet tensile strength at a tensile rate of 100 mm/min by the use of an autograph (produced by Shimadzu Corporation).

(3) Water resistance of film

The film obtained in the same manner as in the above item (2) was immersed in water at 30° C. for 24 hours and the weight change of the wet film taken out from the water was measured after wiping the water on the surface of the film. And the degree of swelling was calculated by the following formula:

Degree of swelling $= (W_2 - W_1)/W_1$
$W_1$: Weight of film before immersion
$W_2$: Weight of film after immersion (4) Hot water resistance of film The film obtained in the same manner as in the above item (2) was immersed in hot water at 100° C. for one (1) hour and the appearance of the film was observed with naked eyes. (5) Heat resistance of film The film obtained in the same manner as in the above item (2) was attached at an end of the film with a weight of a load of 10 g per 1 mm$^2$ of cross-section area of the film. And the temperature at which the film softens to cause the weight to fall was measured on condition that the ambient temperature was raised at a rate of 5° C./min.

EXAMPLE 1

A one (1) liter glass-made polymerization vessel equipped with a reflux condenser, a dropping funnel, a thermometer and a nitrogen blowing nozzle was charged with 400 g of water and 24 g of a carboxyl group-modified polyvinyl alcohol (degree of polymerization of 1750, degree of hydrolysis of 87.5 mol %, random copolymerized with 1 mol % of itaconic acid) and said polyvinyl alcohol was completely dissolved in the water at 95° C.

After cooling of the aqueous solution of the polyvinyl alcohol and purging of the space in the vessel with nitrogen, the aqueous solution was incorporated with 400 g of vinyl acetate with stirring at 140 rpm, and the mixture was heated to 60°° C. and polymerized by the use of a redox initiator of hydrogen peroxide/Rongalite system. The polymerization was completed in 2 hours at a conversion of 99.8% to afford a stable aqueous emulsion of polyvinyl acetate having a solid content of 50.4% and a viscosity of 2900 mPas.s.

To 100 parts of the aqueous emulsion expressed in terms of solid content were added 10 parts of dibutyl phthalate as the plasticizer and one (1) part of polyamide epichlorohydrin (WS-525, produced by Japan PMC Corporation) to prepare an emulsion composition, which was tested to measure the pot-life of the emulsion composition, wet tensile strength of the film, and water resistance, hot water resistance and heat resistance of the film respectively. The results are given in Table 1.

Comparative Example 1

The procedure in Example 1 was repeated to prepare an emulsion composition and evaluate the same except that a polyamide resin was not added to the aqueous emulsion of polyvinyl acetate. The results are given in Table 1.

Comparative Example 2 to 4

The procedure in Example 1 was repeated to prepare emulsion compositions and evaluate the same except that aluminum chloride, diphenylmethane diisocyanate and glyoxal were used in Comparative Examples 2, 3 and 4, respectively in place of polyamide epichlorohydrin. The results are given in Table 1.

Comparative Example 5

The procedure in Example 1 was repeated to carry out emulsion polymerization of vinyl acetate except that 80 g of the carboxyl group-modified polyvinyl alcohol was used. As the result, there was obtained, at a conversion of 99.8%, a stable aqueous emulsion of polyvinyl acetate having a solid content of 51.0% and a viscosity of 13,000 mPas.s. By the use of the aqueous emulsion thus obtained, an emulsion composition was prepared and evaluated in the same manner as in Example 1. The results are given in Table 1.

Comparative Example 6

The procedure in Example 1 was repeated to carry out emulsion polymerization of vinyl acetate except that an unmodified polyvinyl alcohol (degree of polymerization of 1750, degree of hydrolysis of 87.5%) was employed in place of the carboxyl group-modified polyvinyl alcohol. As the result, there was obtained, at a conversion of 99.8%, a stable aqueous emulsion of polyvinyl acetate having a solid content of 50.4% and a viscosity of 2800 mPas.s.

To 100 parts of the aqueous emulsion expressed in terms of solid content were added 10 parts of dibutyl phthalate and 6 parts of a carboxyl group-modified polyvinyl alcohol (degree of polymerization of 1750, degree of hydrolysis of 87.5%, random copolymerized with 1 mol % of itaconic acid) and further one (1) part of polyamide epichlorohydrin (WS-525, produced by Japan PMC Corporation) to prepare an emulsion composition and evaluate the same. The results are given in Table 1.

Comparative Example 7

The procedure in Comparative Example 6 was repeated to prepare an emulsion composition and evaluate the same except that one (1) part of polyamide epichlorohydrin (WS-525, produce by Japan PMC corporation) and 2.5 parts of chitosan (OTS, produced by Dainichiseika Color & Chemicals Mfg. Co., Ltd.) were used in place of one (1) part of polyamide epichlorohydrin. The results are given in Table 1.

Comparative Example 8

The procedure in Comparative Example 6 was repeated to prepare an emulsion composition and evaluate the same except that the carboxyl group-modified polyvinyl alcohol was not post added. The results are given in Table 1.

Comparative Example 9

The procedure in Comparative Example 6 was repeated to prepare an emulsion composition and evaluate the same except that one (1) part of diphenylmethane diisocyanate was used in place of one (1) part of polyamide epichlorohydrin. The results are given in Table 1.

Comparative Example 10

The procedure in Comparative Example 6 was repeated to prepare an emulsion composition and evaluate the same except that one (1) part of diphenylmethane diisocyanate and 0.3 part of aluminum chloride were used in place of one (1) part of polyamide epichlorohydrin. The results are given in Table 1.

TABLE 1-1

| | Protective colloid (dispersant) | | | | |
|---|---|---|---|---|---|
| | added before polymerization | | added after polymerization | | |
| | Type | Parts by weight[1] | Type | Part/s by weight[2] | Type of crosslinking agent |
| Example 1 | IA-PVA[3] | 6 | — | — | polyamide epichlorohydrin |
| Comparative Example 1 | IA-PVA[3] | 6 | — | — | not added |
| Comparative Example 2 | IA-PVA[3] | 6 | — | — | aluminum chloride |
| Comparative Example 3 | IA-PVA[3] | 6 | — | — | diphenylmethane diisocyanate |
| Comparative Example 4 | IA-PVA[3] | 6 | — | — | glyoxal |
| Comparative Example 5 | IA-PVA[3] | 20 | — | — | polyamide epichlorohydrin |
| Comparative Example 6 | unmodified PVA[4] | 6 | IA-PVA[3] | 6 | polyamide epichlorohydrin |
| Comparative Example 7 | unmodified PVA[4] | 6 | IA-PVA[3] | 6 | polyamide epichlorohydrin and chitosan |
| Comparative Example 8 | unmodified PVA[4] | 6 | — | — | polyamide epichlorohydrin |
| Comparative Example 9 | unmodified PVA[4] | 6 | IA-PVA[3] | 6 | diphenylmethane diisocyanate |
| Comparative Example 10 | unmodified PVA[4] | 6 | IA-PVA[3] | 6 | diphenylmethane diisocyanate and aluminum chloride |

Remarks
[1] parts by weight per 100 parts by weight of monomer
[2] parts by weight per 100 parts by weight of solid content of aqueous emulsion
[3] IA-PVA: modified polyvinyl alcohol random-copolymerized with 1 mol % of itaconic acid (degree of polymerization of 1750 and degree of hydrolysis of 87.5 mol %)
[4] unmodified PVA (degree of polymerization of 1750 and degree of hydrolysis of 87.5 mol %)

TABLE 1-2

| | Film performance | | | | |
|---|---|---|---|---|---|
| | Pot-life (hr) | wet tensile strength (kg/cm$^2$) | water resistance (degree of swelling) | hot water resistance | heat resistance (°C.) |
| Example 1 | >700 | 15 | 0.09 | good | >100 |
| Comparative Example 1 | >700 | 0.3 | 0.42 | fractured | 63 |
| Comparative Example 2 | 0.02 | 13 | 0.20 | good | >100 |
| Comparative Example 3 | 3 | 13 | 0.15 | good | >100 |
| Comparative Example | >700 | 0.5 | 0.23 | good | >100 |

TABLE 1-2-continued

| | | Film performance | | | |
|---|---|---|---|---|---|
| | Pot-life (hr) | wet tensile strength (kg/cm$^2$) | water resistance (degree of swelling) | hot water resistance | heat resistance (°C.) |
| Example 4 Comparative Example 5 | >700 | 7 | 0.11 | good | >100 |
| Comparative Example 6 | >700 | 2 | 0.30 | fractured | 90 |
| Comparative Example 7 | >700 | 5 | 0.25 | good | >100 |
| Comparative Example 8 | >700 | 2 | 0.43 | fractured | 70 |
| Comparative Example 9 | 3 | 15 | 0.15 | good | >100 |
| Comparative Example 10 | 0.02 | 15 | 0.13 | good | >100 |

EXAMPLE 2

A one (1) liter glass-made polymerization vessel equipped with a reflux condenser, a dropping funnel, a thermometer and a nitrogen blowing nozzle was charged with 400 g of water and 28 g of a carboxyl group-modified polyvinyl alcohol having a thiol group at an end thereof (degree of polymerization of 500, degree of hydrolysis of 88.2 mol %, random copolymerized with 1 mol % of itaconic acid, [SH] content of $5 \times 10^{-5}$ mol/g-polyvinyl alcohol) and said polyvinyl alcohol was completely dissolved in the water at 95° C. Then, the aqueous solution of the polyvinyl alcohol was cooled and adjusted to pH 4.0 with dilute sulfuric acid, and the space in the vessel was purged with nitrogen. The aqueous solution was incorporated with 80 g of methyl methacrylate and 80 g of n-butyl acrylate with stirring at 140 rpm, and the mixture was heated to 70° C. to initiate polymerization by adding thereto 5 g of 5% aqueous solution of ammonium persulfate. Thereafter, 120 g of methyl methacrylate and 120 g of n-butyl acrylate were successively added over a period of 2 hours. The polymerization was completed in 4 hours at a conversion of 99.9% to afford a stable aqueous emulsion of poly(methyl methacrylate/butyl acrylate) copolymer having a solid content of 51.5% and a viscosity of 900 mPas.s.

To 100 parts of the aqueous emulsion expressed in terms of solid content was added one (1) part of polyamide epichlorohydrin (WS-525, produced by Japan PMC Corporation) to prepare an emulsion composition and evaluate the emulsion composition in the same manner as in Example 1 except that dibutyl phthalate as the plasticizer was not used in this Example 2 and also in Examples 3 and 4 and Comparative Examples 11 to 15. The results are given in Table 2.

Comparative Example 11

The procedure in Example 2 was repeated to prepare an emulsion composition and evaluate the same except that polyamide epichlorohydrin was not added. The results are given in Table 2.

Comparative Example 12

The procedure in Example 2 was repeated to carry out emulsion copolymerization of methyl methacrylate with n-butyl acrylate except that there was used a thiol group end-modified polyvinyl alcohol (degree of polymerization of 500, degree of hydrolysis of 88.2 mol %, [SH] content of $5.0 \times 10^{-5}$ mol/g-polyvinyl alcohol). Thus, there was obtained, at a conversion to polymer of 99.9%, a stable aqueous emulsion of poly(methyl methacrylate/n-butyl acrylate) copolymer having a solid content of 51.4% and a viscosity of 850 mPas s.

To 100 parts of the aqueous emulsion thus obtained expressed in terms of solid content was added one (1) part of polyamide epichlorohydrin to prepare an emulsion composition and evaluate the same. The results are given in Table 2.

Comparative Example 13

The procedure in Example 2 was repeated to prepare an aqueous emulsion of poly(methyl methacrylate/n-butyl acrylate) copolymer except that 16 g of a nonionic emulsifer (Nonypol 200, produced by Sanyo Chemical Industries, Ltd.) was used in place of the carboxyl group-modified polyvinyl alcohol having a thiol group at an end thereof. Thus, there was obtained, at a conversion to polymer of 99.9%, a stable aqueous emulsion having a solid content of 51.4% and a viscosity of 25 mPas.s.

To 100 parts of the aqueous emulsion thus obtained expressed in terms of solid content were added 7 parts of a carboxyl group-modified polyvinyl alcohol (degree of polymerization of 500, degree of hydrolysis of 88.0 mol %, modified with 1 mol % of itaconic acid) and one (1) part of polyamide epichlorohydrin described in Example 2 to prepare an emulsion composition and evaluate the same. The results are given in Table 2.

EXAMPLE 3

A pressure resistance autoclave equipped with a nitrogen blowing nozzle and a thermometer was charged with a hot solution of 12 g of a carboxyl group-modified polyvinyl alcohol having a thiol group at an end thereof (degree of polymerization of 300, degree of hydrolysis of 96.0 mol %, random copolymerized with 1 mol % of itaconic acid, [SH] content of $7 \times 10^{-5}$ mol/g- polyvinyl alcohol) in 290 g of ion-exchanged water. The solution was adjusted to pH 4.0 with dilute sulfuric acid and incorporated with 165 g of styrene and then 135 g of butadiene through a pressure resistance metering tank. After heating the mixture to 70° C., 10 g of 2% aqueous solution of potassium persulfate was fed under pressure into the autoclave to initiate polymerization. The internal pressure decreased with the progress of polymerization at a conversion to polymer of 99.2% from 4.8 kg/cm$^2$ G to 0.4 kg/cm$^2$ G after the elapsed time of 15 hours. The emulsion was adjusted to pH 6.0 with ammonia water to afford a stable aqueous emulsion of poly(styrene/butadiene) copolymer having a solid content of 49.0% and a viscosity fo 2000 mPas s.

To 100 parts of the aqueous emulsion thus obtained expressed in terms of solid content was added one (1) part of polyamide epichlorohydrin (WS-525, produced by Japan PMC Corporation) to prepare an emulsion composition and evaluate the same. The results are given in Table 2.

Comparative Example 14

The procedure in Example 3 was repeated to prepare an emulsion composition and evaluate the same except that polyamide epichlorohydrin was not added. The results are given in Table 2.

EXAMPLE 4

A pressure resistance autoclave equipped with a nitrogen blowing nozzle and a thermometer was charged with a hot solution of 12 g of a carboxyl group-modified polyvinyl alcohol (degree of polymerization of 1750, degree of hydrolysis of 86.5 mol %, random copolymerized with 2 mol % of itaconic acid) in 290 g of ion-exchanged water. The solution was adjusted to pH 4.0 with dilute sulfuric acid and incorporated with 300 g of vinyl acetate and then the autoclave was pressurized up to 45 kg/cm$^2$G with ethylene. The above pressure of ethylene corresponds to a reacting weight of ethylene of 60 g. After heating the solution to 60° C., polymerization was initiated by the use of a redox initiator of hydrogen peroxide/Rongalite system, and completed after 2 hours when the concentration of the residual vinyl acetate monomer decreased to 0.7%. Thus, there was obtained a stable aqueous emulsion of poly(vinyl acetate/ethylene) copolymer having a solid content of 52.5% and a viscosity of 3200 mPas.s.

To 100 parts of the aqueous emulsion thus obtained expressed in terms of solid content was added one (1) part of polyamide epichlorohydrin (WS-525, produced by Japan PMC Corporation) to prepare an emulsion composition and evaluate the same. The results are given in Table 2.

Comparative Example 15

The procedure in Example 4 was repeated to prepare an emulsion composition and evaluate the same except that polyamide epichlorohydrin was not added. The results are given in Table 2.

TABLE 2-2

| | Pot-life (hr) | wet tensile strength (kg/cm$^2$) | water resistance (degree of swelling) | hot water resistance | heat resistance (°C.) |
|---|---|---|---|---|---|
| Example 2 | >700 | 17 | 0.10 | good | >100 |
| Comparative Example 11 | >700 | 1 | 0.40 | fractured | 65 |
| Comparative Example 12 | >700 | 0.5 | 0.43 | fractured | 90 |
| Comparative Example 13 | >700 | 1 | 0.50 | fractured | 60 |
| Example 3 | >700 | 14 | 0.08 | good | >100 |
| Comparative Example 14 | >700 | 0.8 | 0.35 | fractured | 65 |
| Example 4 | >700 | 14 | 0.06 | good | >100 |
| Comparative Example 15 | >700 | 1.2 | 0.30 | fractured | 70 |

What is claimed is:

1. An emulsion composition which comprises an aqueous emulsion (A) obtained by emulsion polymerization of 100 parts by weight of an ethylenically unsaturated monomer in the presence of 1 to 15 parts by weight of a carboxyl group-modified polyvinyl alcohol per 100 parts by weight of monomer as the dispersant, and (B) a polyamide resin.

2. The composition according to claim 1 wherein the ratio by weight of the aqueous emulsion (A) expressed in terms of solid content to the polyamide resin (B) is 100 parts: 0.1 to 30 parts.

3. The composition according to claim 1 wherein the ethylenically unsaturated monomer is at least one monomer selected from the group consisting of a vinyl ester, an acrylic ester, a methacrylic ester, a styrene and a diene.

4. The composition according to claim 1 wherein the polyamide resin (B) is a polyamide resin obtained from polyamide and an epoxy group-containing compound.

5. The composition of claim 4, wherein said polyamide resin is a polyamide epichlorohydrin.

* * * * *

TABLE 2-1

| | Protective colloid (dispersant) | | | | | |
|---|---|---|---|---|---|---|
| | added before polymerization | | added after polymerization | | | |
| | Type | parts by weight[1] | Type | parts by weight[2] | Type of monomer* | Type of crosslinking agent |
| Example 2 | IA-SH-PVA[3] | 7 | — | — | MMA/n-BA | polyamide epichlorohydrin |
| Comparative Example 11 | IA-SH-PVA[3] | 7 | — | — | MMA/n-BA | not added |
| Comparative Example 12 | SH-PVA[4] | 7 | — | — | MMA/n-BA | polyamide epichlorohydrin |
| Comparative Example 13 | Nonypol 200 | 4 | IA-PVA[5] | 7 | MMA/n-BA | polyamide epichlorohydrin |
| Example 3 | IA-SH-PVA[6] | 4 | — | — | St/Bu | polyamide epichlorohydrin |
| Comparative Example 14 | IA-SH-PVA[6] | 4 | — | — | St/Bu | not added |
| Example 4 | IA-PVA[7] | 3.3 | — | — | Et/VAc | polyamide epichlorohydrin |
| Comparative Example 15 | IA-PVA[7] | 3.3 | — | — | Et/VAc | not added |

Remarks
[1] parts by weight per 100 parts by weight of monomer
[2] parts by weight per 100 parts by weight of solid content of aqueous emulsion
[3] IA-SH-PVA: modified polyvinyl alcohol having a thiol group at end thereof and random-copolymerized with 1 mol % of itaconic acid (degree of polymerization of 500, degree of hydrolysis of 88.2 mol % and [SH] content of 5× 10$^{-5}$ mol/g-PVA)
[4] SH-PVA: thiol group-end modified polyvinyl alcohol (degree of polymerization of 500, degree of hydrolysis of 88.2 mol % and [SH] content of 5.0 × 10$^{-5}$ mol/g-PVA)
[5] IA-PVA: modified polyvinyl alcohol random-copolymerized with 1 mol % of itaconic acid (degree of polymerization of 500 and degree of hydrolysis of 88.0 mol %)
[6] IA-SH-PVA: same as IA-SH-PVA[3] except for degree of polymerization of 300, degree of hydrolysis of 96.0 mol % and [SH] content of 7 × 10$^{-5}$ mol/g-PVA
[7] IA-PVA: modified polyvinyl alcohol random copolymerized with 2 mol % of itaconic acid (degree of polymerization of 1750 and degree of hydrolysis of 86.5 mol %)
*Symbol of monomer
MMA: methyl methacrylate, n-BA: n-butyl acrylate, St: styrene, Bu: butadiene, Et: ethylene, VAc: vinyl acetate